US009408066B2

(12) United States Patent
Bradley

(10) Patent No.: US 9,408,066 B2
(45) Date of Patent: Aug. 2, 2016

(54) METHOD FOR TRANSFERRING SECURELY THE SUBSCRIPTION INFORMATION AND USER DATA FROM A FIRST TERMINAL TO A SECOND TERMINAL

(75) Inventor: Paul Bradley, Austin, TX (US)

(73) Assignee: GEMALTO INC., Austin, TX (US)

( * ) Notice: Subject to any disclaimer, the term of this patent is extended or adjusted under 35 U.S.C. 154(b) by 111 days.

(21) Appl. No.: 13/991,766

(22) PCT Filed: Dec. 5, 2011

(86) PCT No.: PCT/EP2011/071737
§ 371 (c)(1),
(2), (4) Date: Oct. 16, 2013

(87) PCT Pub. No.: WO2012/076464
PCT Pub. Date: Jun. 14, 2012

(65) Prior Publication Data
US 2014/0066011 A1 Mar. 6, 2014

Related U.S. Application Data

(63) Continuation-in-part of application No. 13/312,309, filed on Dec. 6, 2011.

(30) Foreign Application Priority Data

Dec. 6, 2010 (EP) .................................. 10306359

(51) Int. Cl.
H04W 8/20 (2009.01)
H04W 12/04 (2009.01)
H04W 4/00 (2009.01)
H04W 84/04 (2009.01)

(52) U.S. Cl.
CPC .............. *H04W 8/205* (2013.01); *H04W 12/04* (2013.01); *H04W 4/008* (2013.01); *H04W 84/042* (2013.01)

(58) Field of Classification Search
CPC .......... H04L 9/32; H04W 8/20; H04W 8/205; H04M 3/16
See application file for complete search history.

(56) References Cited

U.S. PATENT DOCUMENTS

| 6,978,152 | B1 | 12/2005 | Yamaashi et al. |
| 7,024,390 | B1 | 4/2006 | Mori et al. |
| 7,146,161 | B2 | 12/2006 | Chou |
| 7,349,719 | B2 | 3/2008 | Buniatyan |
| 7,363,056 | B2 | 4/2008 | Faisy |
| 9,092,775 | B2 | 7/2015 | Bernard et al. |
| 2002/0186845 | A1 | 12/2002 | Dutta et al. |
| 2004/0131186 | A1 | 7/2004 | Kasuya et al. |
| 2004/0235523 | A1 | 11/2004 | Schrire et al. |
| 2005/0021875 | A1 | 1/2005 | Bouthemy et al. |
| 2005/0164737 | A1 | 7/2005 | Brown |
| 2005/0186954 | A1 | 8/2005 | Kenney |
| 2005/0239504 | A1 | 10/2005 | Ishii et al. |
| 2005/0266883 | A1 | 12/2005 | Chatrath |
| 2005/0279826 | A1 | 12/2005 | Merrien |
| 2006/0049243 | A1 | 3/2006 | Sakamura et al. |
| 2006/0079284 | A1 | 4/2006 | Lu et al. |
| 2006/0086785 | A1 | 4/2006 | Sakata |
| 2006/0196931 | A1 | 9/2006 | Holtmanns et al. |
| 2006/0199614 | A1 | 9/2006 | Hyacinthe |
| 2007/0105532 | A1 | 5/2007 | Martin et al. |
| 2007/0239857 | A1 | 10/2007 | Mahalal et al. |
| 2008/0090614 | A1 | 4/2008 | Sicher et al. |
| 2008/0130879 | A1 | 6/2008 | Heinonen et al. |
| 2008/0261561 | A1* | 10/2008 | Gehrmann ............ H04W 8/205 455/411 |
| 2008/0292074 | A1 | 11/2008 | Boni et al. |
| 2008/0319823 | A1 | 12/2008 | Ahn et al. |
| 2009/0159692 | A1 | 6/2009 | Chew et al. |

(Continued)

FOREIGN PATENT DOCUMENTS

CN 101080051 A 11/2007
CN 101179401 A 5/2008

(Continued)

OTHER PUBLICATIONS

Office Action (Notice of Reasons for Rejection) issued on Aug. 19, 2014, by the Japan Patent Office in Japanese Patent Application No. 2013-542497, and an English Translation of the Office Action. (9 pages).
Office Action (Notice of Preliminary Rejection) issued on Jun. 27, 2014, by the Korean Intellectual Property Office in Korean Patent Application No. 10-2013-7017637, and an English Translation of the Office Action. (7 pages).
Office Action (Notice of Preliminary Rejection) issued on Aug. 19, 2014, by the Korean Intellectual Property Office in Korean Patent Application No. 10-2013-7016486, and an English Translation of the Office Action. (6 pages).

(Continued)

*Primary Examiner* — Myron K Wyche
(74) *Attorney, Agent, or Firm* — Buchanan Ingersoll & Rooney PC

(57) ABSTRACT

The present invention concerns a method for transferring securely the subscription information and user data from a first terminal to a second terminal, the terminals respectively containing a first and a second UICC. According to the invention, the method consists in:
 i—transmitting an identifier of the second terminal to the first terminal;
 ii—transmitting from the first terminal to a secure vault the identifier of the second terminal and an identifier of the first UICC;
 iii—transmitting from the secure vault to the first terminal a subscription installation public key of the second terminal;
 iv—in the first UICC, packaging and encrypting the subscription information and user data with the subscription public installation key of the second terminal;
 v—transmitting the package to the second UICC of the second terminal;
 vi—installing the package on the second UICC.

3 Claims, No Drawings

(56) References Cited

U.S. PATENT DOCUMENTS

| | | |
|---|---|---|
| 2009/0163175 A1 | 6/2009 | Shi et al. |
| 2009/0191857 A1 | 7/2009 | Horn et al. |
| 2009/0191917 A1 | 7/2009 | Zappulla et al. |
| 2009/0191918 A1 | 7/2009 | Mardiks |
| 2009/0215431 A1 | 8/2009 | Koraichi |
| 2009/0217348 A1 | 8/2009 | Salmela et al. |
| 2009/0307142 A1 | 12/2009 | Mardikar |
| 2010/0179907 A1 | 7/2010 | Atkinson |
| 2011/0028126 A1 | 2/2011 | Lim et al. |
| 2011/0035584 A1 | 2/2011 | Meyerstein et al. |
| 2011/0059773 A1 | 3/2011 | Neumann et al. |
| 2011/0126183 A1 | 5/2011 | Bernard et al. |
| 2011/0136482 A1 | 6/2011 | Kaliner |
| 2011/0237190 A1 | 9/2011 | Jolivet |
| 2011/0302641 A1 | 12/2011 | Hald et al. |
| 2011/0320600 A1 | 12/2011 | Froeding et al. |
| 2012/0028609 A1 | 2/2012 | Hruska |
| 2012/0108295 A1 | 5/2012 | Schell et al. |
| 2012/0113865 A1 | 5/2012 | Zhao et al. |
| 2012/0190354 A1 | 7/2012 | Merrien et al. |
| 2012/0297473 A1* | 11/2012 | Case .................. H04L 63/0823 726/10 |
| 2013/0318355 A1 | 11/2013 | Girard et al. |
| 2013/0324091 A1 | 12/2013 | Girard et al. |
| 2013/0329683 A1 | 12/2013 | Berard et al. |
| 2014/0019760 A1 | 1/2014 | Vergnes et al. |
| 2014/0024343 A1 | 1/2014 | Bradley |
| 2014/0031083 A1 | 1/2014 | Vergnes et al. |
| 2014/0057680 A1 | 2/2014 | Proust et al. |
| 2014/0122872 A1 | 5/2014 | Merrien et al. |
| 2014/0141747 A1 | 5/2014 | Merrien et al. |

FOREIGN PATENT DOCUMENTS

| | | |
|---|---|---|
| CN | 101309518 A | 11/2008 |
| DE | 10 2008 033 976 A1 | 1/2010 |
| EP | 1 650 717 A1 | 4/2006 |
| EP | 1 965 596 A1 | 9/2008 |
| EP | 2 056 523 A1 | 5/2009 |
| EP | 2 076 071 A1 | 7/2009 |
| FR | 2 871 020 A1 | 12/2005 |
| GB | 2 457 221 A | 8/2009 |
| JP | 2002-236572 A | 8/2002 |
| JP | 2005-323128 A | 11/2005 |
| JP | 2006-050554 A | 2/2006 |
| JP | 2006-107316 A | 4/2006 |
| JP | 2007-019897 A | 1/2007 |
| JP | 2007-201883 A | 8/2007 |
| JP | 2007-235492 A | 9/2007 |
| JP | 2008-131469 A | 6/2008 |
| JP | 2008-519343 A | 6/2008 |
| JP | 2009-037602 A | 2/2009 |
| JP | 2009-038598 A | 2/2009 |
| JP | 2010-501092 A | 1/2010 |
| JP | 2010-532107 A | 9/2010 |
| JP | 2011-525311 A | 9/2011 |
| JP | 2012-528534 A | 11/2012 |
| KR | 2002-0066032 A | 8/2002 |
| KR | 2003-0044260 A | 6/2003 |
| KR | 10-0489783 B1 | 5/2005 |
| KR | 10-2005-0095424 A | 9/2005 |
| KR | 2007-0095048 A | 9/2007 |
| KR | 10-2008-0014285 A | 2/2008 |
| KR | 10-2008-0015870 A | 2/2008 |
| KR | 10-2009-0056019 A | 6/2009 |
| KR | 10-2010-0095648 A | 8/2010 |
| KR | 10-2010-011642 A | 10/2010 |
| WO | 02/082715 A1 | 10/2002 |
| WO | 03/104997 A1 | 12/2003 |
| WO | 2004/021296 A1 | 3/2004 |
| WO | 2007/058241 A1 | 5/2007 |
| WO | 2008/128874 A1 | 10/2008 |
| WO | WO 2008/123827 A1 | 10/2008 |
| WO | WO/2009/045077 * 4/2009 ................ H04L 9/32 |  |
| WO | 2009/055910 A1 | 5/2009 |
| WO | 2009/092115 A2 | 7/2009 |
| WO | 2009091837 A1 | 7/2009 |
| WO | 2009/095295 A1 | 8/2009 |
| WO | 2009/103623 A2 | 8/2009 |
| WO | 2009/141024 A1 | 11/2009 |
| WO | 2009/141035 A1 | 11/2009 |
| WO | 2009/149788 A2 | 12/2009 |
| WO | 2010/052332 A1 | 5/2010 |
| WO | 2010068016 A3 | 6/2010 |
| WO | 2010/138592 A2 | 12/2010 |
| WO | 2011139795 A1 | 11/2011 |
| WO | 2011159549 A1 | 12/2011 |
| WO | 2012012526 A1 | 1/2012 |
| WO | 2012058092 A1 | 5/2012 |
| WO | 2012058099 A1 | 5/2012 |
| WO | 2012058429 A2 | 5/2012 |
| WO | 2012058446 A1 | 5/2012 |
| WO | 2012058450 A1 | 5/2012 |
| WO | 2012061516 A1 | 5/2012 |
| WO | 2012061561 A2 | 5/2012 |
| WO | 2012065112 A2 | 5/2012 |

OTHER PUBLICATIONS

Office Action (Notice of Reasons for Rejection) issued on Aug. 5, 2014, by the Japan Patent Office in Japanese Patent Application No. 2013-542474, and an English Translation of the Office Action. (4 pages).
International Search Report (PCT/ISA/210) issued on Mar. 28, 2012, by the European Patent Office as the International Searching Authority for International Application No. PCT/EP2011/071737.
Written Opinion (PCT/ISA/237) issued on Mar. 28, 2012, by the European Patent Office as the International Searching Authority for International Application No. PCT/EP2011/071737.
Partial European Search Report issued on Jul. 22, 2011, by the European Patent Office in the European Application No. 10 30 6359. (7 pages).
An English Translation of the Office Action (Notice of Reasons for Rejection) issued on Apr. 15, 2014, by the Japan Patent Office in the Japanese Patent Application No. 2013-542477. (3 pages).
"3rd Generation Partnership Project; Technical Specification Group Services and System Aspects; 3G Security; Specification of the Milenage Algorithm Set; An example algorithm set for the 3GPP authentication and key generation functions f1, f1*, f2, f3, f4, f5 and f5*; Document 2: Algorithm Specification (Release 11)", 3GPP TS 35.206 V11.0.0 (Sep. 2012), pp. 1-31.
"3rd Generation Partnership Project; Technical Specification Group Services and System Aspects; Feasibility Study on Remote Management of USIM Application on M2M Equipment; (Release 8)", 3GPP TR 33.812 V1.0.0 (Sep. 2008), pp. 1-80.
International Search Report (Form PCT/ISA/210) and the Written Opinion of the International Searching Authority (Form PCT/ISA/237) issued on Feb. 22, 2012, by the European Patent Office in the International Application No. PCT/EP2011/071674. (8 pages).
Madlmayr et al., "The Benefit of using SIM Application Toolkit in the Context of Near Field Communication Applications" International Conference on the Management of Mobile Business, (Jul. 2007), (8 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071660. (6 pages).
An English Translation of the Office Action (Notice of Reasons for Rejection) issued on Jun. 17, 2014, by the Japan Patent Office in the Japanese Patent Application No. 2013-542492. (3 pages).
International Search Report (Form PCT/ISA/210) and the Written Opinion of the International Searching Authority (Form PCT/ISA/237) issued on Feb. 15, 2012, by the European Patent Office in the International Application No. PCT/EP2011/071778. (9 pages).
An English Translation of the Office Action (Notice of Reasons for Rejection) issued on Apr. 30, 2014, by the Japan Patent Office in the Japanese Patent Application No. 2013-542496. (2 pages).

(56) References Cited

OTHER PUBLICATIONS

International Search Report (Form PCT/ISA/210) and the Written Opinion of the International Searching Authority (Form PCT/ISA/237) issued on Feb. 27, 2012, by the European Patent Office in the International Application No. PCT/EP2011/071781. (11 pages).
"Smart Cards; Card Application Toolkit (CAT) (Release 9)", ETSI TS 102 223, vol. SCP TEC, No. V9.2.0, (Oct. 1, 2010), pp. 1-209.
"IP Based Over-the Air Handset Configuration Management (IOTA-HCM), 3rd Generation Partnership Project 2 3GPP2", 3GPP2 C.S0040, Version 1.0, Jul. 18, 2003, pp. 1-68.
International Search Report (Form PCT/ISA/210) and the Written Opinion of the International Searching Authority (Form PCT/ISA/237) issued on Feb. 22, 2012, by the European Patent Office in the International Application No. PCT/EP2011/071675. (12 pages).
International Search Report (Form PCT/ISA/210) and the Written Opinion of the International Searching Authority (Form PCT/ISA/237) issued on Apr. 4, 2012, by the European Patent Office in the International Application No. PCT/EP2011/071731. (12 pages).
"3rd Generation Partnership Project; Technical Specification Group Services and System Aspects; Service aspects; Service principles (Release 11)", 3GPP TS 22.101 V11.0.0 (Sep. 2010), pp. 1-60.
International Search Report (Form PCT/ISA/210) and the Written Opinion of the International Searching Authority (Form PCT/ISA/237) issued on Apr. 16, 2012, by the European Patent Office in the International Application No. PCT/EP2011/071919. (7 pages).
International Search Report (Form PCT/ISA/210) and the Written Opinion of the International Searching Authority (Form PCT/ISA/237) issued on Feb. 27, 2012, by the European Patent Office in the International Application No. PCT/EP2011/071664. (8 pages).
Written Opinion of the International Preliminary Examining Authority (Form PCT/IPEA/408) issued on Dec. 13, 2012, by the European Patent Office in the International Application No. PCT/EP2011/071664. (5 pages).
Notification of Transmittal of the International Preliminary Report on Patentability (Forms PCT/IPEA/416 and PCT/IPEA/409) issued on Mar. 8, 2013, by the European Patent Office in the International Application No. PCT/EP2011/071664. (14 pages).
International Search Report (Form PCT/ISA/210) and the Written Opinion of the International Searching Authority (Form PCT/ISA/237) issued on Apr. 12, 2012, by the European Patent Office in the International Application No. PCT/EP2011/071695 and comments filed by the Applicant on May 31, 2012. (10 pages).
International Search Report (Form PCT/ISA/210) and the Written Opinion of the International Searching Authority (Form PCT/ISA/237) issued on Apr. 5, 2012, by the European Patent Office in the International Application No. PCT/EP2011/071785. (9 pages).
Vergnes et al., U.S. Appl. No. 13/992,103, entitle "Method for Exporting Data of a Javacard Application Stored in a UICC to a Host" filed Jun. 6, 2013.
Office Action issued by the U.S. Patent and Trademark Office in the U.S. Appl. No. 13/312,309, mailed Sep. 25, 2013, U.S. Patent and Trademark Office, Alexandria, VA. (13 pages).
Office Action issued by the U.S. Patent and Trademark Office in the U.S. Appl. No. 13/312,309, mailed Apr. 24, 2014, U.S. Patent and Trademark Office, Alexandria, VA. (13 pages).
Office Action (Notice of Preliminary Rejection) issued on Feb. 25, 2015, by the Korean Patent Office in Korean Patent Application No. 10-2013-0717638, and an English Translation of the Office Action. (7 pages).
Office Action issued by the U.S. Patent and Trademark Office in the U.S. Appl. No. 13/991,823, mailed Jan. 5, 2015, U.S. Patent and Trademark Office, Alexandria, VA. (25 pages).
Office Action issued by the U.S. Patent and Trademark Office in the U.S. Appl. No. 13/991,846, mailed Feb. 10, 2015, U.S. Patent and Trademark Office, Alexandria, VA. (26 pages).
Office Action issued by the U.S. Patent and Trademark Office in the U.S. Appl. No. 13/992,065, mailed Dec. 18, 2014, U.S. Patent and Trademark Office, Alexandria, VA. (26 pages).
Office Action issued by the U.S. Patent and Trademark Office in the U.S. Appl. No. 13/991,744, mailed Dec. 12, 2014, U.S. Patent and Trademark Office, Alexandria, VA. (33 pages).
Notice of Allowance issued by the U.S. Patent and Trademark Office in the U.S. Appl. No. 13/991,752, mailed Jan. 21, 2015, U.S. Patent and Trademark Office, Alexandria, VA. (30 pages).
Office Action issued by the U.S. Patent and Trademark Office in the U.S. Appl. No. 13/991,744, mailed Jun. 2, 2015, U.S. Patent and Trademark Office, Alexandria, VA. (35 pages).
Office Action issued by the U.S. Patent and Trademark Office in the U.S. Appl. No. 13/991,689, mailed Jun. 18, 2015, U.S. Patent and Trademark Office, Alexandria, VA. (46 pages).
Office Action issued by the U.S. Patent and Trademark Office in the U.S. Appl. No. 13/991,823, mailed Jul. 13, 2015, U.S. Patent and Trademark Office, Alexandria, VA. (21 pages).
Office Action issued by the U.S. Patent and Trademark Office in the U.S. Appl. No. 13/991,912, mailed Jul. 23, 2015, U.S. Patent and Trademark Office, Alexandria, VA. (45 pages).
Office Action issued by the U.S. Patent and Trademark Office in the U.S. Appl. No. 13/992,103, mailed Jul. 13, 2015, U.S. Patent and Trademark Office, Alexandria, VA. (42 pages).
Office Action issued by the U.S. Patent and Trademark Office in the U.S. Appl. No. 13/992,065, mailed Jul. 30, 2015, U.S. Patent and Trademark Office, Alexandria, VA. (32 pages).
English translation of Office Action issued by the Korean Patent Office on Aug. 28, 2014 in corresponding Korean Application No. 10-2013-7016004. (3 pages).
English translation of Office Action issued by the Korean Patent Office on Apr. 16, 2015 in corresponding Korean Application No. 10-2013-7016004. (2 pages).
Office Action issued by the Russian Patent Office dated Dec. 29, 2014 in corresponding Russian Application No. 2013131034, and English translation of Office Action. (6 pages).
Office Action issued by the U.S. Patent and Trademark Office in the U.S. Appl. No. 13/992,039, mailed Mar. 17, 2015, U.S. Patent and Trademark Office, Alexandria, VA. (35 pages).
Office Action issued by the Chinese Patent Office on Aug. 19, 2015 in corresponding Chinese Application No. 201180058922.2, and English language translation of Office Action (16 pages).
Office Action issued by the Chinese Patent Office on Nov. 4, 2015 in corresponding Chinese Application No. 201180058688.3 (5 pages).
3GPP TS 22.101 V11.0.0, Sep. 2010.
European Office Action dated Dec. 23, 2015 issued in corresponding European Patent Appln. No. 11 810 809.1 (5 pages).
European Office Action dated Jan. 19, 2016 issued in corresponding European Patent Appln. No. 11 811 335.6 (6 pages).
Japanese Office Action dated Jan. 5, 2016 issued in corresponding Japanese Patent Appln. No. 2015-082449, with English translation (5 pages).
Japanese Office Action dated Jan. 19, 2016 issued in corresponding Japanese Patent Appln. No. 2013-054275 with English translation (14 pages).
U.S. Office Action dated Feb. 1, 2016 issued in corresponding U.S. Appl. No. 13/991,823 (15 pages).
U.S. Office Action dated Feb. 2, 2016 issued in corresponding U.S. Appl. No. 13/991,912 (30 pages).
U.S. Office Action dated Feb. 2, 2016 issued in corresponding U.S. Appl. No. 13/992,039 (24 pages).
U.S. Office Action dated Feb. 10, 2016 issued in corresponding U.S. Appl. No. 13/992,065 (23 pages).
Office Action issued Nov. 17, 2015 by the Chinese Patent Office in Corresponding Chinese Patent Application No. 201180058925.6 (10 pages).
Office Action issued by the U.S. Patent and Trademark Office in U.S. Appl. No. 13/992,103, mailed Nov. 25, 2015, U.S. Patent and Trademark Office, Alexandria, VA (22 pages).
Office Action issued by the U.S. Patent and Trademark Office in the U.S. Appl. No. 13/992,039, mailed Oct. 1, 2015, U.S. Patent and Trademark Office, Alexandria, VA. (28 pages).
Office Action issued by the U.S. Patent and Trademark Office in the U.S. Appl. No. 13/991,846, mailed Oct. 15, 2015, U.S. Patent and Trademark Office, Alexandria, VA. (23 pages).
Office Action issued by the U.S. Patent and Trademark Office in the U.S. Appl. No. 14/603,889, mailed Oct. 23, 2015, U.S. Patent and Trademark Office, Alexandria, VA. (36 pages).
Office Action issued by the Chinese Patent Office on Aug. 27, 2015 in corresponding Chinese Application No. 201180058683.0, and English language translation of Office Action. (17 pages).

* cited by examiner

METHOD FOR TRANSFERRING SECURELY THE SUBSCRIPTION INFORMATION AND USER DATA FROM A FIRST TERMINAL TO A SECOND TERMINAL

This disclosure is a national phase of PCT/EP2011/071737, filed Dec. 5, 2011, a continuation-in-part of U.S. application Ser. No. 13/312,309, filed Dec. 6, 2011, and claims priority to European Application No. 10306359.0, filed Dec. 6, 2010, the disclosures of which are hereby incorporated by reference.

The present invention concerns a method for transferring securely the subscription information and user data from a first terminal to a second terminal.

Subscription information and user data of a user are, in the telecommunication domain, stored in a secure element called UICC (Universal Integrated Circuit Card). A UICC embeds a Sim application and is installed, fixedly or not, in terminals, like for example mobile phones. In some cases, the terminals are constituted by machines that communicate with other machines for M2M (Machine to Machine) applications.

A UICC can be in the format of a smart card, or may be in any other format such as for example but not limited to a packaged chip as described in PCT/SE2008/050380, or any other format. It can be used in mobile terminals in GSM and UMTS networks for instance. The UICC ensures network authentication, integrity and security of all kinds of personal data.

In a GSM network, the UICC contains mainly a SIM application and in a UMTS network it is the USIM application. A UICC may contain several other applications, making it possible for the same smart card to give access to both GSM and UMTS networks, and also provide storage of a phone book and other applications. It is also possible to access a GSM network using an USIM application and it is possible to access UMTS networks using a SIM application with mobile terminals prepared for this. With the UMTS release 5 and later stage network like LTE, a new application, the IP multimedia Services Identity Module (ISIM) is required for services in the IMS (IP Multimedia Subsystem). The telephone book is a separate application and not part of either subscription information module.

In a CDMA network, the UICC contains a CSIM application, in addition to 3GPP USIM and SIM applications. A card with all three features is called a removable user identity card, or R-UIM. Thus, the R-UIM card can be inserted into CDMA, GSM, or UMTS handsets, and will work in all three cases.

In 2G networks, the SIM card and SIM application were bound together, so that "SIM card" could mean the physical card, or any physical card with the SIM application.

The UICC smart card consists of a CPU, ROM, RAM, EEPROM and I/O circuits. Early versions consisted of the whole full-size (85×54 mm, ISO/IEC 7810 ID-1) smart card.

Since the card slot is standardized, a subscriber can easily move his wireless account and phone number from one handset to another. This will also transfer their phone book and text messages. Similarly, usually a subscriber can change carriers by inserting a new carrier's UICC card into their existing handset. However, it is not always possible because some carriers (e.g. in U.S.) SIM-LOCK the phones that they sell, thus preventing competitor carriers' cards being used.

The integration of the ETSI framework and the Application management framework of Global Platform is standardized in the UICC configuration.

UICCs are standardized by 3GPP and ETSI.

A UICC can normally be removed from a mobile terminal, for example when the user wants to change his mobile terminal. After having inserted his UICC in his new terminal, the user will still have access to his applications, contacts and credentials (network operator).

It is also known to solder or weld the UICC in a terminal, in order to get it dependent of this terminal. This is done in M2M (Machine to Machine) applications. The same objective is reached when a chip (a secure element) containing the SIM or USIM applications and files is contained in the terminal. The chip is for example soldered to the mother-board of the terminal or machine and constitutes an e-UICC.

A parallel can be done between e-UICCs and UICCs that are not totally linked to devices but that are removable with difficulty because they are not intended to be removed, located in terminals that are distant or deeply integrated in machines. A special form factor of the UICC (very small for example and therefore not easy to handle) can also be a reason to consider it as in fact integrated in a terminal. The same applies when a UICC is integrated in a machine that is not intended to be opened.

In the next description, welded UICCs or chips containing or designed to contain the same applications than UICCs will generally be called embedded UICCs or embedded secure elements (in contrast to removable UICCs or removable secure elements). This will also apply to UICCs or secure elements that are removable with difficulty.

The present invention concerns a method for transferring a subscription between terminals with embedded secure elements (embedded UICCs) storing subscription information over NFC.

In the future, when there will be soft SIMs or embedded SIMs inside terminals, it will be necessary to transfer securely the subscription information (IMSI, Ki, Opc, user data like the phonebook, etc) from one terminal to another (for example by touching them together), in order to avoid reprovisioning the IMSI, Ki, Opc over-the-air into the new terminal using remote personalisation.

Today, if a user wants to change his mobile terminal, he can simply extract the UICC card from his old terminal to insert it in the new one. But this is not possible if the new one does not have a slot for inserting the Sim card (i.e. has an embedded UICC) or if the format of the UICC does not fit to the new terminal. The same problem occurs if the old terminal contains an embedded secure element: the Sim application cannot be extracted manually.

The present invention proposes to solve this problem.

The present invention concerns a method for transferring securely the subscription information and user data from a first terminal to a second terminal, the terminals respectively containing a first and a second UICC. According to the invention, the method consists in:

i—transmitting an identifier of the second terminal to the first terminal;

ii—transmitting from the first terminal to a secure vault the identifier of the second terminal and an identifier of the first UICC;

iii—transmitting from the secure vault to the first terminal a subscription installation public key of the second terminal;

iv—in the first UICC, packaging and encrypting the subscription information and user data with the subscription public installation key of the second terminal;

v—transmitting the package to the second UICC of the second terminal;

vi—installing the package on the second UICC.

Steps i and v are preferably executed over NFC.

The invention preferably applies to embedded UICCs (non removable).

The following description is a use case where subscription information and user data are transmitted over NFC from a first to a second terminal.

If for example, a user has a terminal X (first terminal) and wants to upgrade to a terminal Y (second terminal), the flow would be as follows:

Device X is touched against Device Y. A menu appears on Device X presenting the user a set of options, one of which is "transfer subscription".

Device Y receives a pop-up on the user interface confirming if a new subscription should be installed. This must be approved. Device Y returns its IMEI to Device X over NFC.

Device X sends its IMSI together with Device Y's IMEI over the radio network to a secure vault. The secure vault stores Device Y's subscription installation key which is encrypted and returned to Device X (if authorised).

Device X then packages, encrypts and signs the IMSI, K, Opc plus user data securely with Device Y's key.

A notification appears on Device X's screen prompting the user to re-tap the devices to complete the transfer.

Device X securely transfers the subscription information to Device Y over NFC and once installed device Y alerts the secure vault of the change (in order to confirm the transaction has taken place).

Device Y may now access the radio network using the subscription.

It is also possible to establish a Bluetooth communication between the two terminals or any other channel. Using Bluetooth requires however pairing, exchange of keys etc.

A wifi or Zigbee connexion can also be used. In general, any personal network, wireless area network, short range wired (or not) technology can be used.

The invention allows transfer of subscriptions remotely without passing by an OTA server (only contact with network is needed for authorisation/key exchange/notification of completion of the subscriptions).

In another use case, if Device Y does not have the same profile/capabilities installed as Device X, the secure vault can do a remote personalization of the UICC in Device Y. In this case, it requests Device X to package its profile in its current state (including profile, subscription, keys, user data etc) and upload it to the secure vault. In the case where the two secure elements are not compatible or are different versions, the virtual profile would have to pass through the secure vault and then be transformed for Device Y's different embedded UICC and then repersonalized for the Device Y.

The invention claimed is:

1. Method for transferring securely subscription information and user data from a first terminal to a second terminal, said terminals respectively containing a first and a second UICC, said method comprising:
   i—transmitting an identifier of said second terminal to said first terminal;
   ii—transmitting from said first terminal to a secure vault said identifier of said second terminal and an identifier of said first UICC;
   iii—transmitting from said secure vault to said first terminal a subscription installation public key of said second terminal;
   iv—in said first UICC, packaging and encrypting said subscription information and user data with said subscription public installation key of said second terminal;
   v—transmitting said package to said second UICC of said second terminal; and
   vi—installing said package on said second UICC.

2. Method according to claim 1, wherein steps i and v are executed over near field communication (NFC).

3. Method according to claim 1, wherein said UICCs are embedded UICCs.

* * * * *